Jan. 16, 1945.  M. R. HUTCHISON, JR  2,367,504
DOUBLE-EXPOSURE PREVENTION CAMERA
Filed May 13, 1944  3 Sheets-Sheet 1

MILLER R. HUTCHISON, JR
INVENTOR

Jan. 16, 1945.  M. R. HUTCHISON, JR  2,367,504
DOUBLE-EXPOSURE PREVENTION CAMERA
Filed May 13, 1944  3 Sheets-Sheet 2

MILLER R. HUTCHISON, JR
INVENTOR

BY
ATTORNEYS

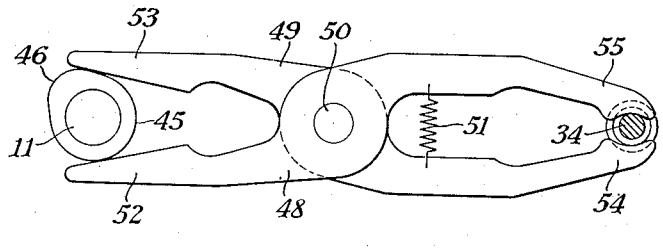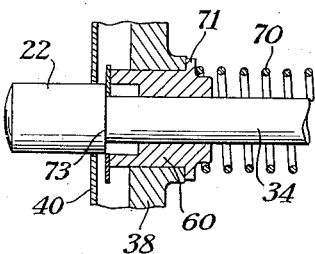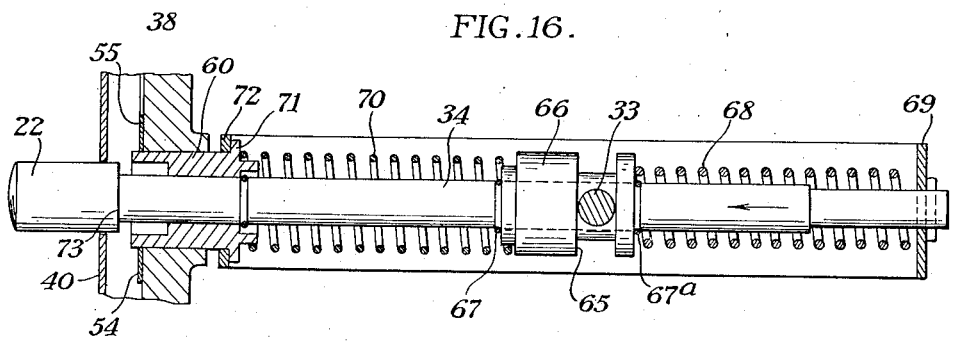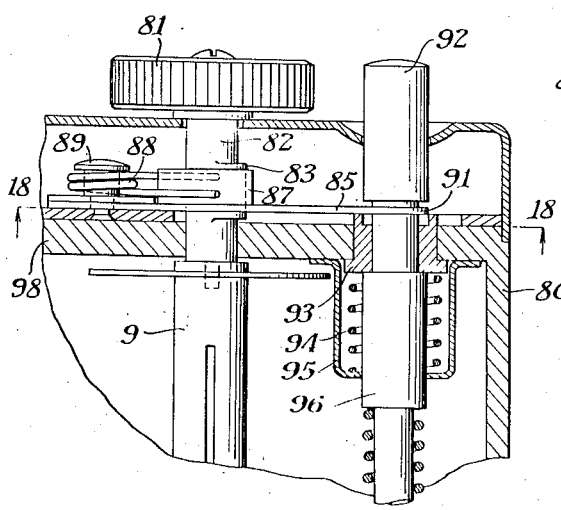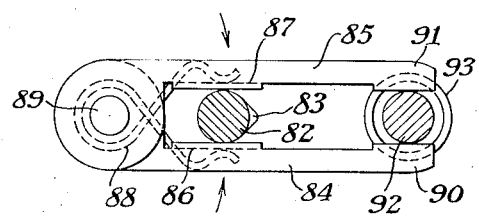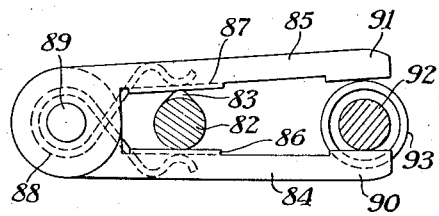

Patented Jan. 16, 1945

2,367,504

UNITED STATES PATENT OFFICE 2,367,504

DOUBLE-EXPOSURE PREVENTION CAMERA

Miller R. Hutchison, Jr., Rochester, N. Y., assignor to Eastman Kodak Company, Rochester, N. Y., a corporation of New Jersey Application May 13, 1944, Serial No. 535,511

16 Claims. (Cl. 95—31)

This invention relates to photography and more particularly to a means for preventing double exposures in a roll film camera. One object of my invention is to provide a device of the class described which is inexpensive and which is sure to operate satisfactorily. Another object of my invention is to provide a device of the class described which can be readily applied to inexpensive types of roll holding cameras and which, for the most part, can be applied to an outside wall of such cameras. A further object of my invention is to provide a double-exposure prevention device which will securely lock the shutter trigger against actuation until film has been wound and in which the so-called "high point" problem of operating double-exposure prevention cameras by cams is definitely overcome. Other objects will appear from the following specification, the novel features being particularly pointed out in the claims at the end thereof.

I am aware that a great many double-exposure prevention devices have been designed, some of which are comparatively satisfactory, but in most cases, if these devices work satisfactorily, they have heretofore been fairly complicated for many reasons. One of these reasons is that, if a cam is used on the film winding key for operating a trigger locking mechanism, it depends on where the cam stops in order for the latching mechanism to function properly. Usually it is necessary to include intermediate mechanism between a cam-operated lever and the trigger to prevent the "high point" problem which is providing a mechanism so arranged that, regardless of the position of the cam, the trigger lock and release will still function properly.

In my improved double-exposure prevention device I have employed only a very few parts which are simple and inexpensive to make and assemble and which satisfactorily overcome the "high point" problem. I have provided a mechanism which will latch the shutter trigger up to the time that a fresh film area is wound into place. My improved camera prevents double exposure by latching the trigger until a film is wound but it does not provide a means which requires the entire amount of film to be wound by an operator because this is thought unnecessary. If an operator starts to wind film it is assumed that he will continue the winding movement until a fresh film is in place. I, therefore, consider it unnecessary to complicate the mechanism by providing a means which will require a complete film area to be wound at each operation of the winding key.

Coming now to the drawings wherein like reference characters denote like parts throughout:

Figs. 14 and 15 are similar to Figs. 4 and 5 but with the parts in the position they assume when the trigger is locked by a single lever arm because of incomplete film winding;

Fig. 16 is a fragmentary sectional view showing the trigger and locking collar and the shutter operating portion of the trigger;

Fig. 17 is a fragmentary sectional view through a double-exposure prevention device constructed in accordance with a second embodiment of my invention;

Fig. 18 is a plan view partially in section showing locking levers used with the second embodiment of my invention in a trigger-locking position; and Fig. 19 is a view similar to Fig. 18 but with one of the locking arms moved from its locking position by means of the winding key.

My invention comprises providing a pair of movable levers positioned so that portions of the lever may be engaged by a cam on a winding key shaft and arranged so that other portions of the levers may engage a trigger mechanism. The portions of the levers which engage the trigger mechanism are resilient and have a normal position of rest against the body of the camera and they are arranged so that, when either of the levers is in an operative position, the trigger may not be operated a distance sufficient to actuate the shutter. However, when the winding key is moved, one lever after the other is moved from its operative locking position and, as soon as the lever is moved from the trigger past a locking collar, the resiliency of the lever moves it from the locking collar.

Figure 1:
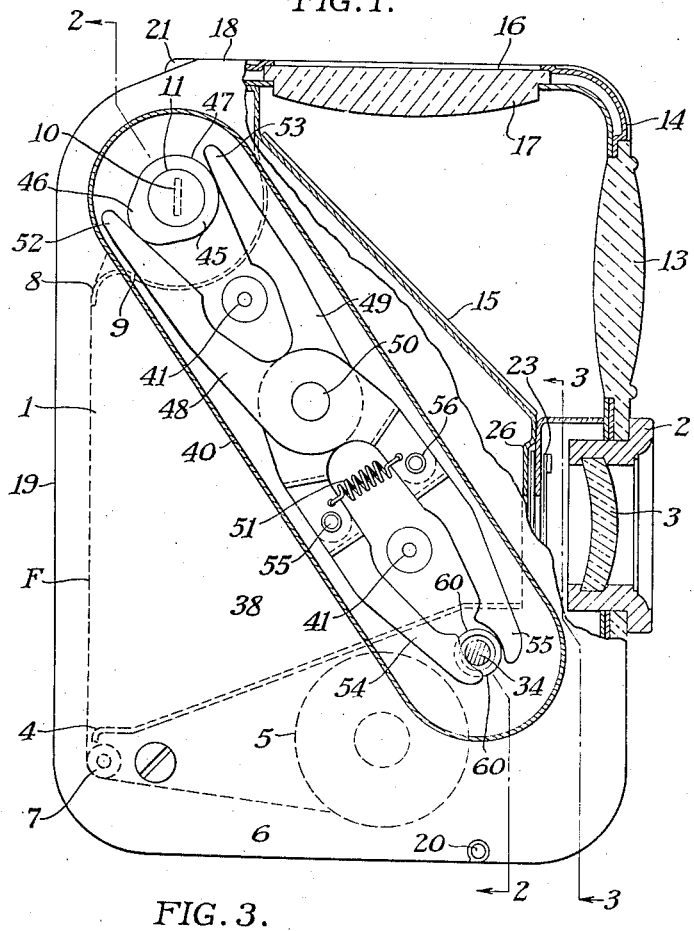
Fig. 1 is a side elevation partially in section and partially broken away showing a typical inexpensive camera constructed in accordance with and embodying a preferred form of my invention.

More specifically, in the embodiment shown in Fig. 1, I have shown a preferred form of double-exposure prevention mechanism applied to an inexpensive camera having a large reflecting view finder. In this instance the camera body 1 is provided with a lens cell 2 supporting in this instance a simple type of objective 3. There is an exposure frame 4 inside of the camera across which a film F may be drawn from a supply spool 5 in the spool chamber 6 over a guide roller 7. From the guide roller 7 the film F crosses the exposure frame 4 and passes about the film guide 8 to a take-up spool 9 which is rotatably attached by a winding key 10, the key shaft 11 of which may be turned by a winding knob 12 in the usual manner.

In the present embodiment I prefer to provide a large finder lens 13 mounted on the front wall 14 of the camera behind which there is a mirror 15 for reflecting an image upwardly upon a collective lens 16 carried by the frame 17 in the top wall 18 of the camera. Film may be loaded into the camera by swinging the camera back 19 about a hinged pintle 20 after releasing a latch 21. The details of this camera back are not disclosed since they form no part of my present invention.

The camera trigger 22 is of the type in which a reciprocating rod actuates a shutter leaf 23, this shutter leaf having an exposure opening 24 which may swing past an exposure aperture 25 in the camera plate 26 when the shutter moves about its pivot 27. This movement is accomplished by means of a hairpin spring 28 engaging a pin 29 carried by the shutter plate and engaging a second pin 30 carried by the cover blade 31 which is provided with an opening 32 adapted to register with the exposure opening 25 when a pin 33 carried by the rod 34 forming the lower part of the trigger is moved in a direction to move the cover plate 31 into registration with the opening 25. This movement tensions and releases the hairpin spring 28 in a known manner, and just as the cover plate 31 reaches its registering position the shutter plate 23 swings across the exposure opening 25 making an exposure.

If desired, a lever 35 may be moved to slide a diaphragm plate 36 to position a small diaphragm opening 37 over the exposure opening 25.

Coming now to my double-exposure prevention device, I provide a mechanism which may be applied to the side wall 38 of the camera which operatively connects the winding key post 11 with the trigger 22. This mechanism may be contained in a shallow box-like housing 40 and may be attached to the camera wall 38 by means of screws 41 best shown in Fig. 2. A groove 42 may be provided in the camera wall 38 to receive the downwardly-turned flange 43 of the housing.

The winding key post 11 is provided with a cam 45 which is in the form of a disk preferably having a high point 46 extending around not over 180° but preferably of considerably less than 180°, the remaining portion of the cam periphery 47 being concentric with the key shaft 11. This cam is contacted by a pair of levers 48 and 49 pivoted on a single stud 50 and drawn together by a spring 51 so that the lever ends 52 and 53 contacting with the cam 45 will always rest against the cam. The opposite ends of these two levers 54 and 55 are preferably made of thin spring metal and they may be riveted or otherwise attached at 55 and 56 to the lever arms 48 and 49. The tension in the lever arms 54 and 55 is downwardly with respect to Fig. 1. That is there is sufficient tension to press these lever arms against the wall 38 of the camera.

Figure 2:
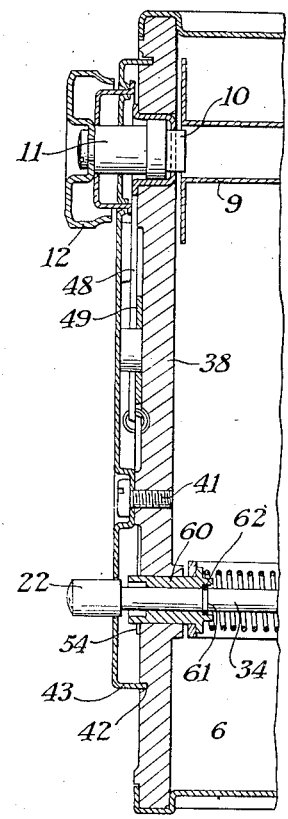
Fig. 2 is a fragmentary sectional detail taken on line 2—2 of Fig. 1.
Figure 3:
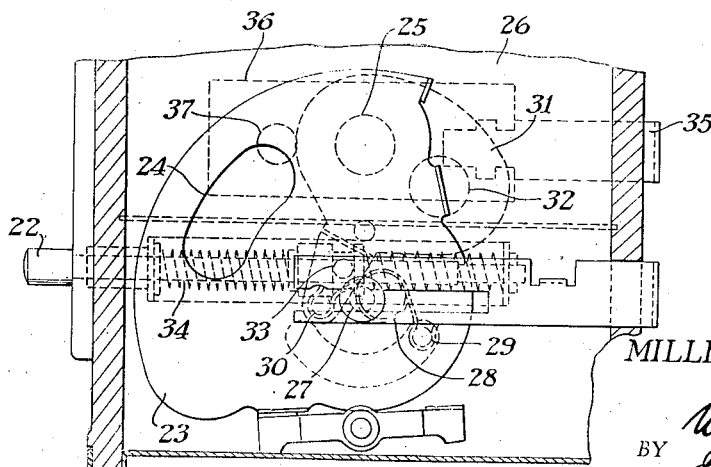
Fig. 3 is a fragmentary front view partially in section taken on line 3—3 of Fig. 1.

Referring to Fig. 2, I provide a locking collar 60 which is slidably mounted on the trigger rod 34, and there is a groove 61 in this rod in which a spring ring 62 is snapped so that the collar may not slide from its position shown relative to the rod.

Referring to Fig. 16 it will be seen that the pin 33 engages in a notch 65 carried by the ferrule 66 which is located on the trigger rod 34 by means of a pair of snap rings 67 and 67a. Each time that the trigger rod 34 is moved the pin 33 must also be moved.

A spring 68 pressing against a flange 69 tends to move the trigger rod 34 with the trigger outwardly in the direction shown by the arrow in Fig. 16 and into a normal position of rest. A second spring 70 pressing on the ferrule 66 and against a flange 71 tends to move the locking collar 60 in the same direction—that is outwardly and into a normal position of rest in which the flange 71 lies against a flange 72.

Figure 4:
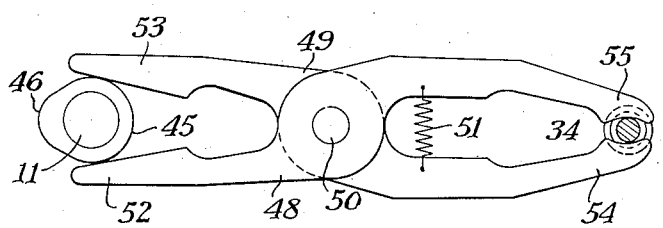
Fig. 4 is a fragmentary plan view of the locking levers in the position they assume immediately after an exposure is made in which the trigger is locked against actuation.
Figure 5:
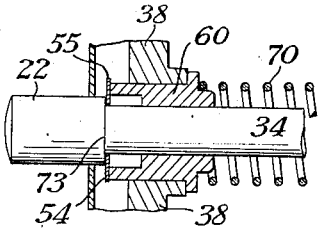
Fig. 5 is a fragmentary view partially in section showing the trigger and the locking mechanism in the position in which the trigger is locked and with the parts in the position indicated in Fig. 4.
Figure 6:
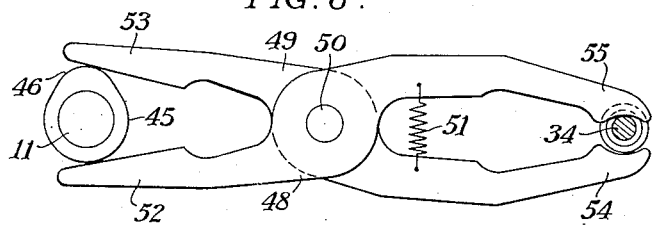
Figs. 6 and 7 are similar to Figs. 4 and 5 but with the parts in the position they assume after the winding key has been turned one-quarter of a turn in starting to wind a fresh area of film into place.
Figure 7:
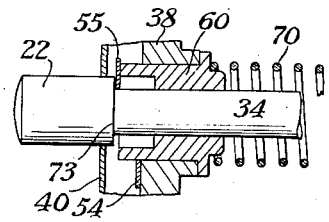
Figure 8:
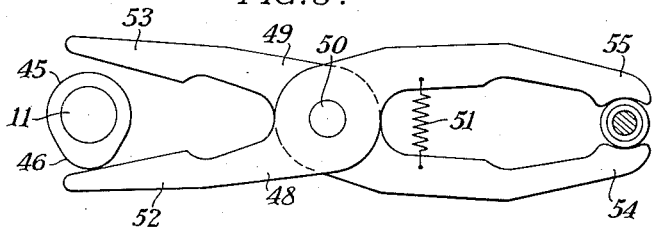
Figs. 8 and 9 are similar to Figs. 4 and 5 but with the parts in the position they assume when the winding key has been turned to advance a fresh area of film into place, thus unlocking the trigger.
Figure 9:
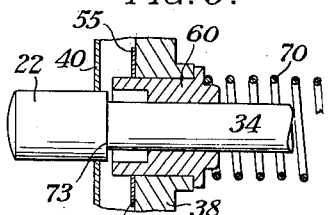

Referring to Figs. 4–15 inclusive, when an exposure has just been made the parts will assume the position shown in Figs. 4 and 5 in which the resilient ends 54 and 55 of the levers 48 and 49 rest against a shoulder 73 of the trigger and against the trigger rod 34. In this position pressure on the trigger in an exposure-making direction will move the trigger and the locking collar 60, but only until the arms 55 and 54 strike the camera wall 38 at which time no further movement will be permitted because the arms 54 and 55 obviously cannot pass through the opening in which the locking collar 60 is slidably mounted. Therefore, the trigger is locked, not against any movement, but against sufficient movement to tension and release the hairpin shutter spring 28. The operator is thereby notified that it is necessary to wind a fresh film into place.

Figure 10:
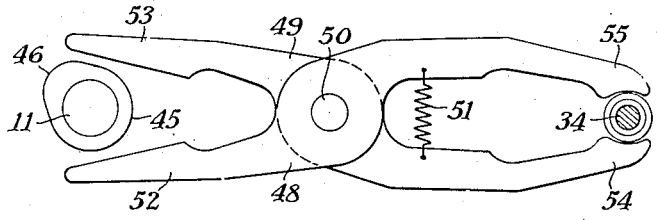
Figs. 10 and 11 are similar to Figs. 4 and 5 but, when the parts are in the position they assume when the trigger is being depressed to make an exposure, the trigger is only partially depressed and not yet being moved to its exposure-making position.
Figure 11:
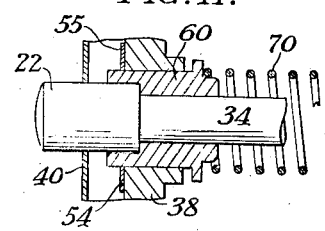
Figure 12:
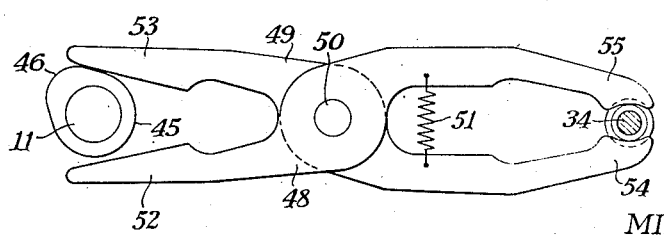
Figs. 12 and 13 are similar to the preceding figures but with the parts in the position they assume when the trigger has been fully pressed in to cause an exposure to be made.
Figure 13:
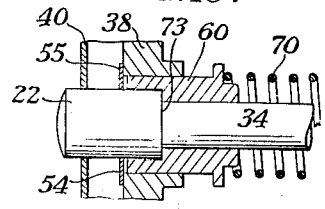

The high point 46 of the cam 45 may be in any position because the angle of rotation of shaft 11 varies from each exposure from 1 to 12 or whatever other number of exposures may be contained on the film. As the key post 11 is rotated by the winding knob 12 the high point 46 of the cam is rotated and it will first engage one of the two levers, such as lever 49 in Fig. 6, thus rocking the ends of this lever 53 and 54 so that end 54 of the lever will be moved from the end of the locking collar 60 and will immediately snap down against the camera wall 38 due to the tension in the spring arm. Further winding of the knob 12 will cause the high point 46 to engage and move the opposite lever 48, removing the spring arm 55 from the end of the locking collar 60 so that this arm may reach its inoperative position shown in Fig. 9. Thus, both arms have been removed from their locking position and continued rotation of the winding key post, as indicated in Fig. 10, will serve only to wind the film since both the levers 48 and 49 are now in an inoperative position. The camera is ready for exposure and Fig. 11 shows the trigger 22 to be depressed but not completely depressed a distance sufficient to operate the trigger. The completely depressed position of the trigger is shown in Fig. 13 and it will be noticed from this figure that the lever arms 48 and 49 may be moved together so as to engage the outside of the trigger head. It is, of course, possible that the high point of the cam may interfere with one arm or the other of the lever and prevent its return to the position shown in Fig. 12, but this is not important because the trigger may be locked by either lever 48 or 49 alone.

With the parts as shown in Fig. 13, as the spring 68 returns the trigger 22 after pressure thereon is released, the spring arms 54 and 55—or one of them—will slide along the surface of the trigger until the shoulder 73 is reached at which time one or both arms 53 and 54 will snap behind the shoulder, between the shoulder and the end of the locking collar 60 so that the parts will then be in the position shown in Fig. 15. In Figs. 14 and 15 one arm 49 is held out of locking engagement because the high point 46 of the cam happened to stop partially under this arm a distance sufficient to prevent the spring arm 54 from moving inwardly against the trigger rod 34. However, if the trigger should now be depressed, it would still be locked against complete movement because arm 55 would not permit the trigger to be moved downwardly a distance sufficient to actuate the shutter because of the camera wall 38. If the high point 46 of the cam should lie between the arms 52 and 53 as shown in Fig. 4, both arms as shown in Fig. 5 would latch the trigger.

Since it would be impossible to make an exposure with the double-exposure prevention elements in the positions of Figs. 4, 5 and Figs. 14, 15, an operator would turn the winding key 12 and release the arms as above described. It will be obvious that with the above-described embodiment of my invention, operation of the trigger cannot take place after an exposure irrespective of the position of the high point of the cam. It is also obvious that a partial revolution of the winding key shaft 11 releases both arms one after the other.

There are obviously many different embodiments of my invention which can be readily arranged, and in Figs. 17-19 I have shown a second embodiment particularly adapted to cameras having a winding key and trigger close together. In this embodiment the camera body 80 may include a winding key 81 carried by a winding key post 82 carrying a small cam 83 which is in this case merely a protuberance on one side of the shaft. A pair of latching levers 84 and 85 normally engage the winding key post 82 and flanges 86 and 87 are in the path of the cam 83 so as to be operated thereby. A spring 88 tends to move the two arms about their pivot 89 in the direction shown by the arrows. The ends of these arms 90 and 91 rest against the shutter trigger 92 and, since the shutter trigger is surrounded by a slidable locking collar 93 spring-pressed upwardly by a spring 94 carried in the housing 95 and since the trigger shaft 96 resembles the trigger shaft 34 of the first embodiment of my invention in construction, the operation of this double-exposure prevention device is very like the one first described.

In other words, the trigger 92 is latched by the spring arms 90—91 when the parts are in the position shown in Fig. 18 and full depression of the trigger 92 is prevented by these arms striking the camera wall 98. However, by turning the winding knob 81, one arm after the other is moved from its latching position to snap down over locking collar 93 to release the trigger. Fig. 19 shows one lever arm 85 removed from its latching position and further rotation of the winding key 81 will similarly release the opposite arm 84. When both arms are moved to an inoperative position the trigger 92 may be operated.

It will be noticed, in both of these embodiments of my invention, that the "high point" problem of a winding key shaft cam is completely overcome, since it is impossible to leave the winding key shaft in any position in which both of the lever arms will be held in an inoperative position. With the embodiment shown in Figs. 1–16 the lever arms are pivoted between the winding key and trigger, and in the embodiment shown in the remaining figures the arms are pivoted to one side of the winding shaft and trigger because in this latter embodiment the winding key and trigger are close to each other.

In both embodiments the double-arm arrangement cooperates with both the winding key shaft and trigger to form a foolproof latching mechanism for the trigger releasable only when the winding key shaft has been moved a material distance to wind a fresh area of film into place.

I claim:

1. A double-exposure prevention device for cameras comprising, in combination, a camera, a film winding key post carried thereby, a cam carried by the key post, a shutter trigger, a collar slidably mounted and encircling the trigger, a spring normally holding the collar in one position, and a pair of levers both pivotally mounted on a stud and having cam engaging portions thereon and resilient portions positioned to engage and release the trigger and collar, said levers being movable by the winding key post cam to a trigger releasing position by winding a film by turning said key post.

2. A double-exposure prevention device for cameras comprising, in combination, a camera, a film winding key post carried thereby, a cam carried by the key post, a shutter trigger, a collar slidably mounted and encircling the trigger, a spring normally holding the collar in one position, and a pair of levers both pivotally mounted on a stud and having cam engaging portions thereon and resilient portions positioned to engage and release the trigger and collar, a spring means for holding the levers in engagement with the cam to move through contact therewith, either of said levers locking said trigger against movement when said lever directly engages the trigger and overlies the end of the collar.

3. A combination in accordance with claim 1 in which the levers are pivotally mounted intermediate the ends of the levers.

4. A combination in accordance with claim 1 in which the stud on which the levers are mounted is positioned substantially between the winding key post and the trigger.

5. A combination in accordance with claim 1, characterized by a cam having a single high point extending from a concentric area of at least 180°.

6. A combination in accordance with claim 1, characterized by a cam having a high point of such a shape that only one lever arm at a time may be moved by said cam whereby said cam must be moved more than 90° to move both levers.

7. A combination as claimed in claim 1 in which the spring normally holding the collar in one position surrounds the trigger and tends to move the collar towards the operating end on the trigger.

8. A combination as claimed in claim 1 in which the trigger is of the type of a plunger with a spring tending to hold said trigger outwardly in an operative position, and in which said first-mentioned spring tends to hold said collar outwardly and in the same direction.

9. In a double exposure prevention device for a camera having walls and having a film winding knob, a shutter and a trigger for releasing the shutter, the combination with said winding knob and trigger of mechanism operatively connecting the winding knob and trigger including a cam carried by the winding knob, a collar slidably mounted on the trigger, means for limiting movement of the collar on the trigger and two pivotally mounted levers movable to and from positions contacting with the cam, trigger and collar, a shoulder on the trigger, at least one of said levers preventing shutter operating movement of the trigger when positioned between trigger shoulder and collar.

10. In a double exposure prevention device for a camera having walls and having a film winding knob, a shutter and a trigger for releasing the shutter, the combination with said winding knob and trigger of mechanism operatively connecting the winding knob and trigger including a cam carried by the winding knob, a collar slidably mounted on the trigger, means for limiting movement of the collar on the trigger and two pivotally mounted levers movable to and from positions contacing with the cam, trigger and collar, a shoulder on the trigger, at least one of said levers preventing shutter operating movement of the trigger when positioned between the trigger shoulder and collar, and movable from said position between the trigger shoulder and collar by said cam.

11. A combination in accordance with claim 9 in which there is a housing enclosing the said mechanism.

12. A combination in accordance with claim 9 in which there is a housing enclosing said mechanism mounted on a wall of said camera, said camera wall limiting movement of said pivoted levers in one direction.

13. A combination in accordance with claim 9 in which the levers engaging the trigger and collar are spring biased toward a wall of the camera and in which movement of the trigger and collar in an exposure-making direction may be prevented when a spring biased arm engages the trigger and collar and contacts with the camera wall.

14. A combination as called for in claim 9 in which at least that portion of the arms engagable with the collar and trigger are spring biased toward a wall of the camera, said collar holding an arm out of an operative trigger restricting position when said arm snaps down against the camera body contacting with the outside of said collar.

15. A combination in accordance with claim 9 in which there is means for limiting the movement of the collar on the trigger, and a spring means tending to hold the collar against movement with the trigger in an exposure-making direction, a camera wall including an aperture through which the trigger and collar may move, the collar being movable to a position in which the lever arm may move over the end of the collar and contact with the trigger.

16. A combination in accordance with claim 9 in which there is means for limiting the movement of the collar on the trigger, and a spring means tending to hold the collar against movement with the trigger in an exposure-making direction, and means carried by the trigger for engaging and moving the collar against its spring during an exposure-making movement of the trigger.

MILLER R. HUTCHISON, Jr.